US010788208B2

(12) United States Patent
Jarry et al.

(10) Patent No.: US 10,788,208 B2
(45) Date of Patent: Sep. 29, 2020

(54) METHOD FOR PREHEATING A FLUID UPSTREAM OF A FURNACE

(71) Applicant: L'Air Liquide, Societe Anonyme pour l'Etude et l'Exploitation des Procedes Georges Claude, Paris (FR)

(72) Inventors: Luc Jarry, Beaufai (FR); Peter Van Kampen, Canton, GA (US)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 88 days.

(21) Appl. No.: 16/316,224

(22) PCT Filed: Jun. 29, 2017

(86) PCT No.: PCT/FR2017/051742
§ 371 (c)(1),
(2) Date: Jan. 8, 2019

(87) PCT Pub. No.: WO2018/007723
PCT Pub. Date: Jan. 11, 2018

(65) Prior Publication Data
US 2019/0390856 A1 Dec. 26, 2019

(30) Foreign Application Priority Data
Jul. 8, 2016 (FR) ...................................... 1656584

(51) Int. Cl.
*F23L 7/00* (2006.01)
*F24H 9/00* (2006.01)
(Continued)

(52) U.S. Cl.
CPC ............... *F23L 7/005* (2013.01); *F23L 7/007* (2013.01); *F23N 3/00* (2013.01); *F24H 9/0084* (2013.01);
(Continued)

(58) Field of Classification Search
CPC ......... F23L 7/005; F23L 7/007; F23L 15/045; F23L 2900/07005; F23L 2900/07007;
(Continued)

(56) References Cited

U.S. PATENT DOCUMENTS 4,137,965 A * 2/1979 Fallon, Jr. ............. F23L 15/045
122/504.2
2011/0259574 A1* 10/2011 Angel ...................... F28D 7/16
165/287

(Continued)

FOREIGN PATENT DOCUMENTS

| CN | 201 680 745 | 12/2010 |
| EP | 0 231 962 | 8/1987 |
| WO | WO 2006 054015 | 5/2006 |

OTHER PUBLICATIONS

International Search Report and Written Opinion for PCT/FR2017/051742, dated Sep. 27, 2017.

*Primary Examiner* — David J Laux
(74) *Attorney, Agent, or Firm* — Christopher J. Cronin

(57) ABSTRACT

Method for indirectly preheating a fluid upstream of a furnace, wherein the fluid is preheated by indirect heat exchange with fumes discharged from the furnace through a medium in a chamber, and wherein the flow rate of the medium in the chamber is adjusted on the basis of at least one of the following temperatures: the temperature of the discharged fumes, the temperature of the medium in the chamber, the temperature of the preheated fluid, and the temperature of the wall separating the discharged fumes from the medium in the chamber.

14 Claims, 2 Drawing Sheets

(51) Int. Cl.
    *F23N 3/00*    (2006.01)
    *F23L 15/04*   (2006.01)
(52) U.S. Cl.
    CPC ... *F23L 15/045* (2013.01); *F23L 2900/07005* (2013.01); *F23L 2900/07007* (2013.01); *F23L 2900/15043* (2013.01); *F23N 2225/08* (2020.01); *Y02E 20/344* (2013.01); *Y02E 20/348* (2013.01)
(58) Field of Classification Search
    CPC ......... F23L 2900/15043; F24H 9/0084; F23N 3/00; F23N 2225/08
    See application file for complete search history.

(56) References Cited

U.S. PATENT DOCUMENTS

| | | | |
|---|---|---|---|
| 2014/0080073 A1* | 3/2014 | Zanganeh | F23J 15/006 431/11 |
| 2015/0083032 A1* | 3/2015 | Zebian | F22B 35/002 110/206 |
| 2016/0194569 A1* | 7/2016 | Graf | F23G 5/48 423/648.1 |
| 2016/0238245 A1* | 8/2016 | Okamoto | F23L 15/04 |
| 2016/0377351 A1* | 12/2016 | Park | F23C 10/00 165/119 |

* cited by examiner

METHOD FOR PREHEATING A FLUID UPSTREAM OF A FURNACE

CROSS-REFERENCE TO RELATED APPLICATIONS

This application is a § 371 of International PCT Application PCT/FR2017/051742, filed Jun. 29, 2017, which claims § 119(a) foreign priority to French patent application FR 1656584, filed Jul. 8, 2016.

BACKGROUND

Field of the Invention

The present invention relates to the preheating of a fluid upstream of a furnace by heat exchange with flue gases discharged from the furnace.

Related Art

The company Air Liquide has developed and industrializes an oxy-fuel combustion technology in a furnace, according to which technology the oxygen for combustion and where appropriate also the fuel are preheated upstream of the furnace by indirect heat exchange with the flue gases discharged from the furnace.

A distinction is made between direct heat exchange and indirect heat exchange.

During a direct heat exchange, a fluid is heated with a hotter fluid by heat exchange across a wall that separates the fluid to be heated from the hotter fluid.

Indirect heat exchange is understood to mean a heat exchange in two steps of direct exchange via an intermediate fluid.

Thus, in the known oxy-fuel combustion technology of the company Air Liquide:

an intermediate fluid is heated by direct heat exchange with the flue gases across a first wall in a first step and in a second step in which the oxygen for combustion (and where appropriate also the fuel) is (are) preheated by direct heat exchange with the intermediate fluid heated in the first step across a second wall.

Such technology is in particular described in WO 2006/054015 within the context of an exchanger for a combustion furnace.

The exploitation of this technology has demonstrated that it enables considerable efficiency savings in the case of furnaces that operate continuously and without frequent significant modifications in the operating mode of the furnace and which continuously generate a flow of hot flue gases that is sufficient for preheating the oxygen and/or the fuel to a desired temperature. The flow rate and the temperature of the flue gases generated by such a furnace do not therefore normally vary significantly or abruptly during the operation of the furnace.

Indirect heat exchange is also known in the field of water boilers with a burner, see EP-A-0231962, and also in the field of heat exchangers for the recovery of residual heat of the flue gases of a boiler, see CN-U-201680745.

SUMMARY OF THE INVENTION

The objective of the present invention is to provide an indirect preheating technology based on the principles mentioned above which is more suitable for furnaces that generate hot flue gases, the flow rate and/or the temperature of which vary significantly during the operation of the furnace.

This is in particular the case for batch furnaces, of which the combustion and therefore the production of hot flue gases are interrupted during shutdown phases of the furnace between two active phases of the furnace and vary according to the active phases of the furnace.

For this purpose, the present invention proposes an improved process for preheating a fluid upstream of a furnace by heat exchange with flue gases discharged from the furnace through a duct.

According to this process, a liquid or gaseous medium passes through a chamber at a first flow rate. This medium is used as heat transfer medium between the hot flue gases and the fluid to be preheated.

The flue gases in the duct heat the intermediate medium in the chamber by heat exchange across a wall, referred to as "first wall", separating the intermediate medium which is in the chamber from the flue gases which are in the discharge duct, with a heated medium being obtained.

The fluid to be preheated passes through at least one line at a second flow rate. A wall, referred to as "second wall", separates the fluid to be preheated which is in the at least one line, on the one hand, from the medium inside the chamber, on the other hand.

The fluid to be preheated may thus pass through a single such line or a bundle of such lines. When the fluid to be preheated passes through several such lines, the second flow rate corresponds to the overall flow rate of the fluid to be preheated, i.e. the sum of the flow rates of fluid to be preheated passing through the various lines.

The at least one line passed through by the fluid to be preheated may, for example, be located inside the chamber. In this case, the outer wall of the at least one line inside the chamber constitutes the second wall.

The heated medium, which is in the chamber, preheats the fluid that is in the at least one line by heat exchange across the second wall. Thus a preheated fluid is obtained that is conveyed to the furnace with a view to the introduction thereof into the furnace.

According to the present invention, the first flow rate, i.e. the flow rate of the medium (heat transfer fluid) in the chamber is regulated as a function of at least one of the following temperatures:

the temperature of the flue gases in the duct,
the temperature of the heated medium,
the temperature of the preheated fluid, and
the temperature of the first wall.

According to the invention, the first flow rate may be regulated as a function of a single one of said temperatures. It is also possible and generally advantageous to regulate the first flow rate as a function of several of said temperatures, for example as a function of:

the temperature of the flue gases in the duct and the temperature of the heated medium;
the temperature of the flue gases in the duct and the temperature of the preheated fluid;
the temperature of the flue gases in the duct and the temperature of the first wall;
the temperature of the heated medium and the temperature of the preheated fluid;
the temperature of the heated medium and the temperature of the first wall;
the temperature of the preheated fluid and the temperature of the first wall;

the temperature of the flue gases in the duct, the temperature of the heated medium and the temperature of the preheated fluid;

the temperature of the flue gases in the duct, the temperature of the heated medium and the temperature of the first wall;

the temperature of the flue gases in the duct, the temperature of the preheated fluid and the temperature of the first wall;

the temperature of the heated medium, the temperature of the preheated fluid and as a function and the temperature of the first wall;

the temperature of the flue gases in the duct, the temperature of the heated medium, the temperature of the preheated fluid and the temperature of the first wall.

The process according to the present invention therefore uses a variable flow rate of the medium in the chamber. This makes it possible to adapt the heat recovery and the preheating of the fluid to the operation of the furnace.

When the furnace is, for example, a batch furnace, the invention makes it possible to regulate the heat recovery and the preheating of the fluid as a function of the operating step or state of the furnace.

The fluid to be preheated may be an oxidant for combustion, and in particular such an oxidant having an oxygen content of from 50 vol % to 100 vol %, a fuel or any other fluid to be supplied to the furnace at high temperature. The invention is particularly advantageous for preheating an oxidant for combustion. In this case, the oxidant for combustion advantageously has an oxygen content of at least 80 vol %, and preferably of at least 90 vol %.

The invention also makes it possible to combine the preheating of several fluids to be preheated, for example of the oxidant for combustion and of the fuel, each fluid to be preheated then passing through at least one line dedicated to said fluid to be preheated.

The medium which passes through the chamber (heat transfer fluid) is preferably a gaseous medium such as, for example, air, nitrogen, $CO_2$ or steam. The use of air as medium is often preferable due to its availability and its innocuousness.

Downstream of the chamber, the medium, which generally still has a temperature above ambient temperature, may be used for other applications (for example as heat source for heating plants or buildings, in a drying plant, for the production of electricity in a Rankine cycle or, when the medium is an oxidant, as oxidant for combustion). Another possibility is to recycle the fluid to the chamber.

In the absence of particular measures, such as the injection of cold air into the duct upstream of the chamber, the temperature and the flow rate of the flue gases discharged are determined by the process which takes place in the furnace.

The flow rate of the fluid to be preheated in the at least one line is normally also determined by the requirements of the process in the furnace.

The temperature of the heated medium, the temperature of the preheated fluid and the temperature of the first wall, on the other hand, may be modified by changing the flow rate of the medium in the chamber (first flow rate). Specifically, at identical flow rates and temperatures (a) of the flue gases in the duct and (b) of the fluid to be preheated, an increase in the first flow rate (flow rate of the medium in the chamber) leads to a drop in the temperature of the first wall that separates the flue gases from the medium, a drop in the temperature of the preheated medium, and also a drop in the temperature of the preheated fluid. Similarly, at identical flow rates and temperatures of the flue gases in the duct and of the fluid to be preheated, a reduction in the first flow rate leads to an increase in the temperature of the first wall, an increase in the temperature of the preheated medium, and also an increase in the temperature of the preheated fluid.

The percentage of the thermal energy discharged from the furnace by the flue gases which is recycled to the furnace by the preheated fluid increases with the preheating temperature Tf of said fluid.

The present invention makes it possible to achieve a high preheating temperature Tf, while guaranteeing a high level of safety.

As a general rule, the first flow rate is regulated so that the preheated fluid has a temperature Tf at least equal to a predetermined minimum temperature Tfmin. When the temperature Tf drops below Tfmin, the first flow rate is reduced so as to increase the temperature of the heated medium and thus also the temperature Tf of the preheated fluid. This minimum temperature Tfmin may be constant or may vary over time (Tfmin(t)) as a function of the changes/progress of the process taking place in the furnace. Tfmin is typically determined so as to ensure a certain degree of improvement in energy efficiency owing to the preheating of the fluid.

According to a first embodiment, the first flow rate is regulated so that the temperature Tpp of the first wall remains less than or equal to a first predetermined maximum temperature Tppmax. This temperature Tppmax is typically a constant. Tppmax normally depends on the nature of the constituent material(s) of the first wall. More particularly, when the temperature Tpp of the first wall exceeds this value Tppmax, the first flow rate is increased so as to lower the temperature of the first wall Tpp. Indeed, it is advisable to ensure that the temperature of the chamber and in particular of the first wall does not reach a temperature at which the physical integrity of this structure risks being compromised.

According to a second embodiment, the first flow rate is regulated so as to maintain the temperature Tf of the preheated fluid below a second predetermined maximum temperature Tfmax.

When the temperature Tf of the preheated fluid reaches this maximum temperature Tfmax, the first flow rate is increased so as to lower the temperature Tf of the preheated fluid. This second maximum temperature Tfmax is also typically a constant. It generally depends on the nature of the fluid to be preheated.

Thus, when the fluid to be preheated is an oxidant with an oxygen content between 50 vol % and 100 vol %, it is possible to regulate the first flow rate so as to maintain the temperature Tox (=Tf) of the preheated oxidant below a predetermined maximum oxidant temperature Toxmax. This is especially useful in order to protect the at least one line/the second wall, and also the elements in contact with the preheated oxidant downstream of the at least one line against the structural modifications that may give rise to an accelerated corrosion by the preheated oxidant, or even a self-ignition under certain pressure conditions. Toxmax may for example be 550° C. when the line(s) in which the preheated oxidant flows is (are) made of a material that is highly resistant to oxidation, such as in particular INCONEL, or else 400° C. when the material is a less resistant material such as stainless steel. As indicated above, the oxidant to be preheated may in particular have an oxygen content of at least 80 vol %, or even of at least 90 vol %.

When the fluid to be preheated is a fuel, it is possible to regulate the first flow rate so as to maintain the temperature Tcomb (=Tf) of the preheated fuel below a predetermined maximum fuel temperature Tcombmax as a function of the nature of the fuel. In this way, it is possible to avoid a thermal degradation of the fuel, for example by cracking. For natural gas, for example, Tcombmax may be of the order of 450° C. in order to avoid any risk of decomposition of the natural gas at a higher temperature, producing a deposit of soot.

The regulation of the first flow rate is preferably carried out in an automated manner by means of a control unit.

When the first flow rate is regulated so that the temperature Tf of the preheated fluid is greater than or equal to Tfmin and/or less than Tfmax (such as Toxmax for an oxidant or Tcombmax for a fuel), it is useful to measure the temperature Tf of the preheated fluid and to regulate the first flow rate as described above by comparing the temperature Tf measured with the predetermined temperature Tfmin, respectively Tfmax.

Similarly, when the first flow rate is regulated so as to maintain the temperature Tpp of the first wall below the first maximum temperature Tppmax, it is possible to measure the temperature of the first wall and to regulate the first flow rate as described above by comparing the temperature Tpp measured with the first maximum temperature Tppmax.

Given that the fluid is preheated by heat exchange with the medium in the chamber, it is also possible to measure the temperature Tmil of the heated medium in the chamber and to regulate the first flow rate so that the temperature Tf of the preheated fluid is at least Tfmin and/or is less than Tfmax as a function of the temperature Tmil measured. For example, when the measured temperature Tmil of the heated medium exceeds a third predetermined maximum temperature Tmilmax, the first flow rate will be increased in order to lower the temperature Tmil of the heated medium and therefore the temperature Tf of the preheated fluid and/or when the measured temperature Tmil of the heated medium drops below a predetermined minimum temperature Tmilmin, the first flow rate is reduced so as to increase the temperature Tmil of the heated medium and to increase the temperature Tf of the preheated fluid.

It is also possible, for regulating the first flow rate, to detect the temperature Tfum of the flue gases in the duct in contact with the first wall.

Specifically, as indicated previously, the temperatures of the heated medium and of the preheated fluid are, for a given plant, determined by the temperature of the discharged flue gases in contact with the first wall and by the temperature and the flow rate (first flow rate) of the heat transfer medium introduced into the chamber.

It is therefore possible to ensure that the temperature Tf of the preheated fluid is at least Tfmin and/or is less than Tfmax and/or that the temperature Tpp of the first wall does not exceed Tppmax by regulating the first flow rate as a function of the measured value of the temperature Tfum of the discharged flue gases in contact with the first wall.

For example, when the temperature Tfum of the discharged flue gases in contact with the first wall exceeds a fourth predetermined maximum temperature Tfummax the first flow rate will be increased so as to lower the temperature Tpp of the first wall, to lower the temperature Tmil of the heated medium and/or to lower the temperature Tf of the preheated fluid.

As already indicated, it is also possible to combine the various embodiments described above, for example by measuring various temperatures and by regulating the first flow rate as a function of the various temperatures so as to meet all of the previously selected applied criteria.

It is known from the prior art, when there is a risk of an overheating of the first wall with the discharged flue gases, to cool the flue gases discharged from the furnace upstream of a heat exchanger by injecting ambient air into said discharged flue gases.

According to one embodiment of the process according to the invention, the temperature of the flue gases in the discharge duct of the furnace is measured and the temperature of the flue gases in contact with the first wall is regulated by injecting a cooling gas into the flue gases upstream of the first wall which separates the discharged flue gases from the medium in the chamber. The cooling gas may originate from the same source as the medium that is introduced into the chamber. Such a cooling of the discharged flue gases is an alternative way of ensuring that the temperature Tpp of the first wall remains below the predetermined temperature Tppmax.

As already indicated, the regulation of the first flow rate is preferably carried out in an automated manner by means of a control unit. When the regulation of the first flow rate is carried out on the basis of one or more measured temperatures, the measured temperature(s) is or are supplied to said control unit.

When the process according to the invention comprises a step of cooling the discharged flue gases by injection of a cooling gas into the flue gases upstream of the first wall, the flow rate of cooling gas is advantageously also regulated by said control unit, or even the distribution between the flow rate of the medium sent to the chamber and the flow rate of the cooling gas injected into the flue gases when the medium and the cooling gas originate from the same source.

The first flow rate and/or the flow rate of the cooling gas are advantageously regulated not only, as indicated above, so as to maintain the temperature Tf and/or the temperature Tpp within a desired temperature range, but also so as to avoid heat shocks in the chamber (and in particular in the first wall).

The flow rate of the medium in the chamber (first flow rate) may be regulated in various ways, and in particular:
- by adjusting the speed of a variable speed pump or blower which ensures the flow of the medium through the chamber, or
- by adjusting the opening of a control valve, for example a control valve on a duct conveying the medium to the chamber, a control valve on a duct discharging the heated medium from the chamber, or of another valve directly or indirectly determining the flow rate of medium to the chamber.

The furnace from which the flue gases are discharged and toward which the preheated fluid is sent may be a "continuous" furnace. As indicated above, the invention is in particular intended to be used in furnaces/processes that generate hot flue gases, the flow rate and/or the temperature of which vary/varies significantly during the operation of the furnace. In the case of a continuous furnace, these variations may be intrinsic to the process used in the furnace, may be linked to changes in the production (flow rate, properties of the product treated or generated) and/or may be the result of progressive phenomena such as the wear, fouling, etc. of the plant.

The furnace may also be a batch furnace, for example:
- a rotary furnace for melting cast iron,
- a rotary furnace for melting and recycling nonferrous metals,
- a tilting furnace for melting and recycling nonferrous metals,
- a rotary or tilting furnace for melting enamels,
- a furnace for melting and recycling metals of electric arc furnace (EAF) type.

BRIEF DESCRIPTION OF THE FIGURES

The process according to the present invention and the advantages thereof are described in greater detail in the examples below, reference being made to FIGS. 1 to 2 in which.

DETAILED DESCRIPTION OF THE INVENTION

Figure 1:
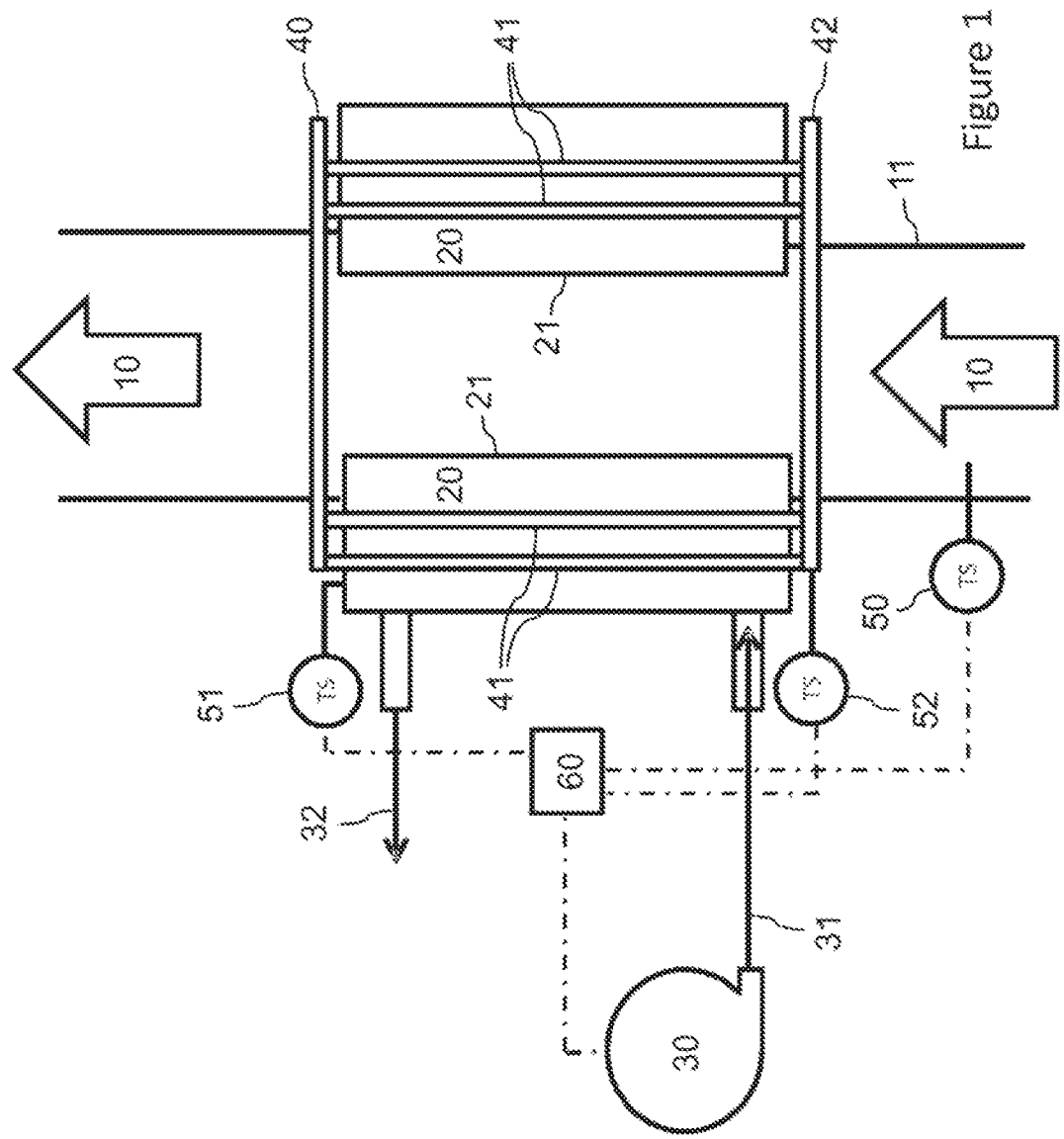
FIG. 1 is a partial schematic representation of a process according to the invention and of a plant (in cross section) for the implementation thereof.

According to the example illustrated in FIG. 1, the hot flue gases 10 generated in the furnace (not represented) are discharged from the furnace through the duct 11.

A chamber 20 surrounds the flue gas discharge duct 11.

A variable-speed ambient air blower 30 introduces a regulated flow rate of ambient air 31 into the chamber 20 so as to create a flow of air in the chamber 20 that is cocurrent with the flow of the flue gases 10 in the duct 11.

A first wall 21 physically separates the flue gases 10 in the duct 11 from the air in the chamber 20 so as to enable a heat exchange between the flue gases 10 in the duct 11 and the air in the chamber 20 across this first wall 21. The air in the chamber 20 thus absorbs a portion of the heat which was discharged from the furnace with the flue gases. Heated air is thus obtained in the chamber 20.

A fluid 40 to be preheated is introduced into a bundle of lines 41 that pass through the chamber 20. The outer wall of said lines 41 (referred to as second wall) separates the fluid in the lines 41 physically from the medium (air) in the chamber 20. This second wall operates as heat exchange surface between the air and the fluid to be preheated so as to obtain preheated fluid 42. The air in the chamber 20 therefore acts as heat transfer fluid between the hot flue gases 10 in the duct 11 and the fluid to be preheated in the lines 41.

The preheated fluid 42 is then discharged from the bundle of lines 41 and conveyed to the furnace.

When the preheated fluid 42 is an oxidant for combustion or a fuel, the preheated oxidant or fuel is typically conveyed to one or more burners of the furnace and/or injectors through which the preheated fluid is injected into the furnace.

After the preheating of the fluid, the air 32 is discharged from the chamber 20, typically in order to be used as heat source or as fuel oxidizer in a downstream plant.

As described above, in certain cases the temperature of the hot flue gases 10 in contact with the first wall 21 is so high that an overheating of the first wall 21 is possible and measures must be provided to prevent such an overheating (in particular an injection of cooling gas into the hot flue gases 10 and/or an increase in the first flow rate).

In other cases, the thermal energy present in the hot flue gases 10 and available for the preheating of the fluid to be preheated is not sufficient to preheat the fluid to an optimal temperature upstream of the furnace. Heated air 32 discharged from the chamber 20 may then be injected into the hot flue gases 10 at the chamber 20 in order to give rise to a combustion (referred to as post-combustion) of the CO and/or other unburnt materials and/or partial combustion products in the hot flue gases 10. Such a post-combustion makes it possible to increase the temperature of the flue gases 10 at the chamber 20 and thus to heat the fluid 40 (for example oxygen or natural gas) to a higher temperature.

In the example illustrated in FIG. 1, the fluid to be preheated is an oxidant for combustion (fuel oxidizer) having an oxygen content of 97 vol % at least which flows in the lines 41 countercurrently with the air in the chamber 20.

A first temperature detector (thermocouple) 50 detects the temperature Tfum of the hot flue gases 10 in the duct 11 directly upstream of the chamber 20.

A second detector 51 detects the temperature Tmil of the heated air in the vicinity of the heated air outlet of the chamber 20. In the embodiment illustrated, the second detector 51 detects more specifically the temperature Tg of the wall of the chamber 20 in contact with the heated air at this location, the temperature Tg thus being a measurement for the temperature Tmil of this heated air.

A third detector 52 detects the temperature Tf of the preheated fluid at the outlet of the bundle of lines 41.

Each of the three detectors 50, 51 and 52 is connected to a control unit 60 which regulates the speed of the air blower 30 and thus also the flow rate of ambient air 31 that is supplied to the chamber 20.

The software of the unit 60 calculates, at least approximately, the temperature of the first wall on the basis of the temperature of the hot flue gases 10 detected by the first detector 50 and the known flow rate and temperature of the ambient air. The control unit 60 then verifies if the flow rate of ambient air generated by the blower 30 is such that the temperature Tpp of the first wall 21 will not exceed a predetermined maximum temperature Tppmax (by comparing the calculated value with the value Tppmax). If the actual ambient air flow rate (first flow rate) is not sufficient to provide the necessary cooling of the first wall 21, so that there is a risk of an overheating of the first wall 21, the control unit increases the speed of the air blower 30 and thus also the flow rate of ambient air 31 to the chamber 20.

The control unit 60 also compares the temperature Tf (more particularly Tox in the embodiment illustrated) of the preheated fluid detected by the third detector 52 with a predetermined maximum value Tfmax (more particularly Toxmax). When the temperature Tf detected reaches the maximum value Tfmax, the control unit 60 increases the speed of the air blower 30 and thus also the flow rate of ambient air 31 to the chamber 20, which ultimately results in a drop in the temperature Tf of the preheated fluid.

The control unit 60 also compares the temperature Tf detected by the detector 52 with a minimum temperature Tfmin for the preheated fluid, which minimum temperature may change over time as a function of the requirements of the process taking place in the furnace. If the temperature Tf detected is below the minimum temperature Tfmin, the control unit reduces the speed of the air blower 30 and thus also the flow rate of ambient air 31 to the chamber 20 in order to achieve a higher preheating temperature Tf of the fluid at the outlet of the bundle of lines 41. However, the setpoints linked to the maximum temperatures Tppmax and Tfmax take precedence for safety reasons. The control unit 60 therefore maintains at all times the speed of the air blower 30 above the speed at which the temperature Tpp would exceed the predetermined maximum temperature Tppmax and above the speed at which the temperature Tf would reach or exceed the temperature Tfmax.

On the basis of the temperature Tg detected by the second detector 51, the control unit verifies the correct operation of the chamber 20 and of the two detectors 50 and 52. For this purpose, the control unit 60 verifies if the temperature Tg of the chamber detected by the second detector 51 corresponds in substance to the temperature which was theoretically/mathematically to be expected in view of the detected temperature Tfum of the hot flue gases, of the speed of the blower 30 and the known temperature of the ambient air, of the flow rate of the fluid to be preheated and of the detected temperature Tf of the preheated fluid at the outlet of the lines 41. When the temperature Tg detected differs significantly from this theoretical/mathematical temperature, the control unit 60 emits a warning signal. Specifically, a significant difference between the temperature Tg detected and the theoretical/mathematical temperature may signify a failure of one of the detectors 50 and 52, or else a leak in the chamber 20 or in the lines 41.

The leaktightness of the chamber 20 may also be verified/monitored by means of a pressure detector (not illustrated) which detects the pressure of the medium in the chamber 20 or downstream of the chamber 20. The control unit 60 compares the pressure detected with the theoretical/mathematical pressure of the medium to be expected in view of the pressure and flow rate of the medium 60 at the inlet of the chamber 20. The control unit 60 then emits a warning signal when the pressure detected differs significantly from the theoretical/mathematical pressure.

The detector 51 may also be used in order to avoid heat shocks in the chamber 20, in the lines 41 and in the first wall 21, knowing that such heat shocks may weaken said structures. Thus, according to one embodiment, the control unit 60: (a) verifies the gradient (rate of change) $\Delta Tmil/\Delta t$ of the temperature Tmil of the heated medium (or the gradient $\Delta Tg/\Delta t$ of the temperature Tg of a portion of the chamber 20 in contact with this heated medium) and (b) regulates the variations of the first flow rate so as to maintain this gradient $\Delta Tmil/\Delta t$ (or $\Delta Tg/\Delta t$) below a predetermined $\Delta T/\Delta t$ threshold, in particular by limiting the gradient of the speed of the blower 30 and therefore thus the gradient of the first flow rate.

As the temperature of the medium at the inlet of the chamber 20 (ambient air in the present example) may vary significantly over time, it is useful to provide an additional temperature detector (not illustrated) also linked to the control unit 60 which detects the temperature of the medium 31 at the inlet of the chamber 20. Indeed, as already indicated above, the temperature of the medium 31 at the inlet of the chamber 20 also has an impact on the temperature of the first wall Tpp, the temperature of the heated medium Tmil and the temperature of the preheated fluid Tf. In the case of a medium 31 having a significantly variable temperature at the inlet of the chamber 20 (for example that varies as a function of the ambient temperature or when the medium circulates in a closed circuit), any significant variation of the temperature of the medium 31 at the inlet of the chamber 20 must also be taken into account by the control unit 60 in order to determine the flow rate (first flow rate) with which the medium 31 must be supplied to the chamber 20 (for example by regulating the speed of the blower 30) so as to meet the criteria as disclosed above. On the other hand, it is not necessary to adjust the first flow rate in the case of a nonsignificant variation of the temperature of the medium 31 at the inlet of the chamber 20.

It is thus useful to set a $\Delta Ts$ threshold (for example of the order of 10° C.), below which the variations of the temperature of the medium 31 at the inlet of the chamber 20 are considered nonsignificant and starting from which ($\geq \Delta Ts$) the temperature variations are considered significant within the meaning of the present paragraph.

Figure 2:
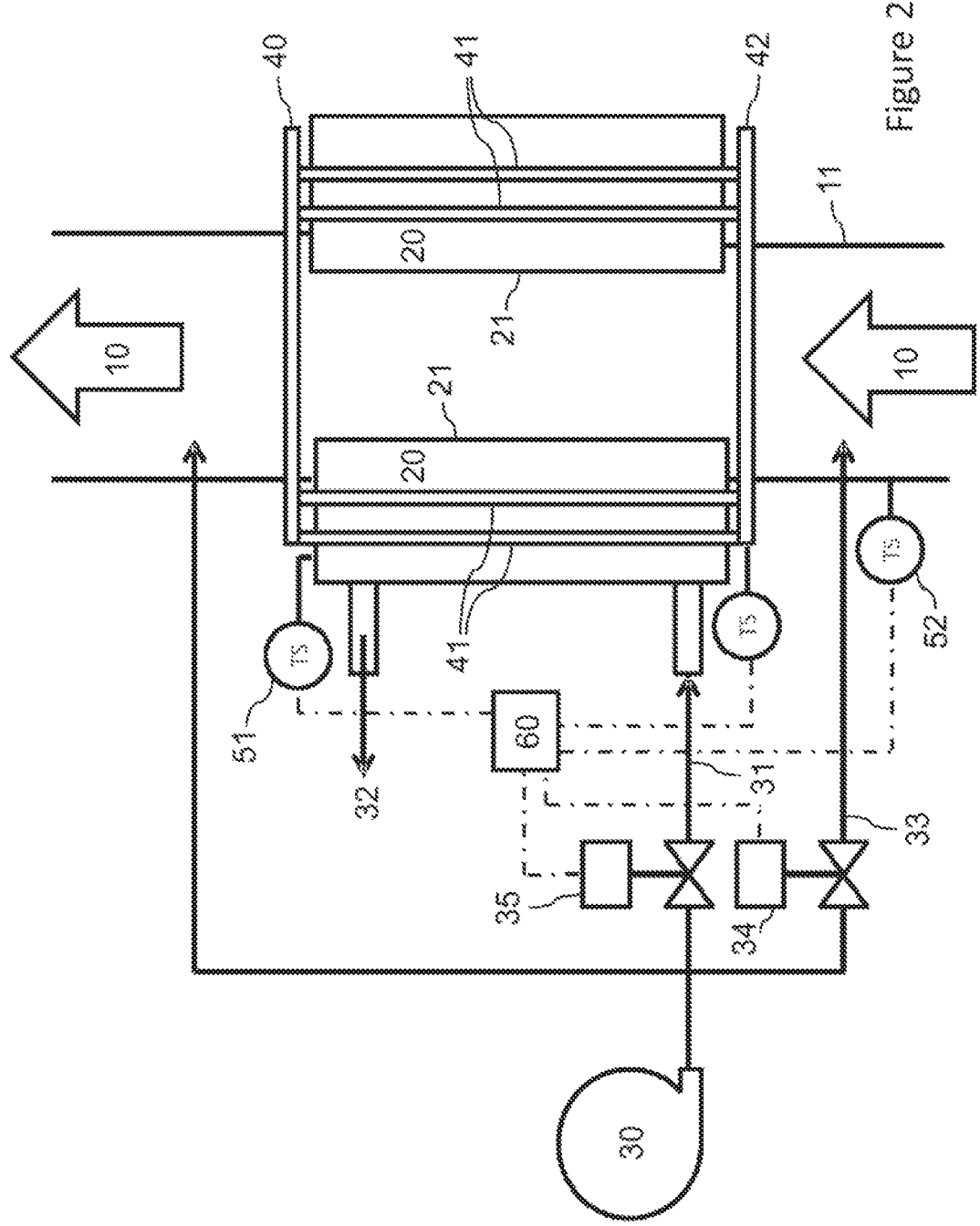
FIG. 2 is a partial schematic representation of another process according to the invention and of a plant (in cross section) for the implementation thereof.

According to one alternative embodiment illustrated in FIG. 2, the blower 30 is a constant-speed air blower which therefore generates a constant overall flow rate of ambient air.

According to the embodiment of FIG. 2, the first wall 21 is protected against excessive temperatures (above Tppmax) by lowering the temperature of the hot flue gases 10 upstream of the chamber 20. For this purpose, the temperature detector 50 detects the temperature Tfum of the hot flue gases 10 in the duct 11 upstream of the chamber 20. When the temperature Tfum of the hot flue gases detected by the detector 50 is such that it may result in a temperature Tpp of the first wall 21 that exceeds the maximum temperature Tppmax, taking account of the flow rate (and of the temperature) of the medium introduced into the chamber 20, the control unit orders a cooling of said hot flue gases 10 upstream of the chamber 20. When the temperature of the hot flue gases detected by the detector 50 is such that the temperature Tpp of the first wall 21 will not exceed the maximum temperature Tppmax, the control unit 60 orders the shutdown of such a cooling of the hot flue gases 10 upstream of the chamber 20. The control unit 60 may more particularly order the cooling of the hot flue gases 10 upstream of the chamber 20 by regulating the injection, at a controlled flow rate, of a cooling gas 33 into these hot flue gases 10, for example by regulating the opening of a valve 34 on a duct conveying cooling gas 33 to the duct 11.

In the embodiment illustrated in FIG. 2, the cooling gas 33 is a fraction of the ambient air supplied by the blower 30. An adjustable-opening valve 34 is mounted on a bypass of the air outlet from the blower 30, which bypass sends ambient air 33 to the discharge duct 11 upstream of the chamber 20 for the regulation of the temperature Tfum.

The first flow rate (flow rate of ambient air 31 introduced into the chamber 20) is regulated by the control unit 60 by means of the valve 35 on a second branch of the air outlet from the blower 30. The control unit 60 regulates this first air flow rate so as to achieve a suitable temperature Tf of the preheated fluid 42 by heat exchange with the medium (air) 31 in the chamber 20, as described in detail in connection with FIG. 1.

Another branch of the air outlet from the blower 30 sends the rest of the flow rate of ambient air generated by the blower 30 to the duct 11 downstream of the chamber 20.

This last portion of ambient air is used for cooling the flue gases 10 downstream of the chamber 20, for example in order to cool said flue gases to a temperature of the order of 170° C. upstream of a dust filter (not illustrated).

Although, in the two figures, the medium passes through the chamber 20 cocurrently with the flue gases 10 in the duct 11, the medium may also pass through the chamber 20 countercurrently with the flue gases 10 in the duct 11.

Similarly, although, in the two figures, the fluid to be heated flows in the bundle of lines 41 countercurrently with the medium in the chamber, the fluid to be preheated may also flow cocurrently with the medium in the chamber 20.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

Tf Temperature of the preheated fluid
Tfmin Predetermined minimum preheating temperature of the fluid
Tfmax Predetermined maximum preheating temperature of the fluid
Tox Temperature of the preheated oxidant
Toxmax Predetermined maximum preheating temperature of the oxidant
Tcomb Temperature of the preheated fuel
Tcombmax Predetermined maximum preheating temperature of the fuel
Tpp Temperature of the first wall
Tppmax Predetermined maximum temperature of the first wall
Tmil Temperature of the heated medium in the chamber
Tmilmin Predetermined minimum temperature of the heated medium in the chamber
Tmilmax Predetermined maximum temperature of the heated medium in the chamber
Tfum Temperature of the flue gases discharged from the furnace
Tfummax Predetermined maximum temperature of the flue gases discharged from the furnace
Tg Temperature of the wall of the chamber in contact with the heated medium

What is claimed is:

1. A process for preheating a fluid upstream of a furnace by heat exchange with flue gases discharged from the furnace through a duct, said process comprising the steps of:

passing a liquid or gaseous medium through a chamber at a first flow rate;
heating the medium in the chamber by heat exchange with the flue gases in the duct across a first wall separating the medium in the chamber from the flue gases in the duct, thereby obtaining a heated medium;
passing the fluid through at least one line at a second flow rate, the at least one line having a second wall separating the fluid inside the at least one line from the medium inside the chamber;
preheating the fluid in the at least one line by heat exchange, across the second wall, with the medium heated in the chamber, thereby obtaining a preheated fluid; and
conveying the preheated fluid to the furnace;
regulating the first flow rate as a function of at least one of the following temperatures: a temperature Tfum of the flue gases in the duct, a temperature Tmil of the heated medium, a temperature Tf of the preheated fluid, and a temperature Tpp of the first wall.

2. The process of claim 1, wherein the medium is a gaseous medium.

3. The process of claim 2, wherein the medium is selected from one of air, nitrogen, $CO_2$, and steam.

4. The process of claim 2, wherein the medium is air.

5. The process of claim 1, wherein the first flow rate is regulated so that the temperature Tpp of the first wall remains less than or equal to a first predetermined maximum temperature Tppmax.

6. The process of claim 1, wherein the first flow rate is regulated so that the preheated fluid has a temperature Tf at least equal to a predetermined minimum temperature Tfmin.

7. The process of claim 1, wherein the fluid is an oxidant for combustion or a fuel.

8. The process of claim 7, wherein the fluid is an oxidant having an oxygen content of from 50 vol % to 100 vol %.

9. The process of claim 7, wherein the preheated fluid is conveyed to one or more burners and/or injectors of the furnace through which the preheated fluid is injected into the furnace.

10. The process of claim 1, wherein the fluid to be preheated is an oxidant with an oxygen content between 50 vol % and 100 vol % and the first flow rate is regulated so as to maintain the temperature Tox of the preheated fluid below a second predetermined maximum temperature Toxmax.

11. The process of claim 1, wherein the fluid to be preheated is a fuel and the first flow rate is regulated so as to maintain the temperature Tcomb of the preheated fluid below a third predetermined maximum temperature Tcombmax.

12. The process of claim 1, wherein the first flow rate is regulated by adjusting the speed of a pump or of a blower which ensures the flow of the medium through the chamber.

13. The process of claim 1, wherein the first flow rate is regulated by a control valve on a duct conveying the medium to the chamber.

14. The process of claim 1, wherein the first flow rate is regulated by a valve on a duct discharging the heated medium from the chamber.

* * * * *